United States Patent
Wang et al.

(10) Patent No.: US 11,874,855 B2
(45) Date of Patent: Jan. 16, 2024

(54) PARALLEL DATA ACCESS METHOD AND SYSTEM FOR MASSIVE REMOTE-SENSING IMAGES

(71) Applicant: Computer Network Information Center, Chinese Academy of Sciences, Beijing (CN)

(72) Inventors: Xuezhi Wang, Beijing (CN); Jianghua Zhao, Beijing (CN); Xiaohua Zhou, Beijing (CN); Qinghui Lin, Beijing (CN); Yuanchun Zhou, Beijing (CN)

(73) Assignee: Computer Network Information Center, Chinese Academy of Sciences, Beijing (CN)

( * ) Notice: Subject to any disclaimer, the term of this patent is extended or adjusted under 35 U.S.C. 154(b) by 95 days.

(21) Appl. No.: 17/423,875

(22) PCT Filed: Jun. 24, 2019

(86) PCT No.: PCT/CN2019/092487
§ 371 (c)(1),
(2) Date: Jul. 18, 2021

(87) PCT Pub. No.: WO2020/252799
PCT Pub. Date: Dec. 24, 2020

(65) Prior Publication Data
US 2022/0121688 A1 Apr. 21, 2022

(30) Foreign Application Priority Data
Jun. 18, 2019 (CN) .......................... 201910524378.4

(51) Int. Cl.
*G06F 16/28* (2019.01)
*G06F 16/2457* (2019.01)
*G06F 16/22* (2019.01)

(52) U.S. Cl.
CPC .......... *G06F 16/285* (2019.01); *G06F 16/221* (2019.01); *G06F 16/2237* (2019.01); *G06F 16/24573* (2019.01)

(58) Field of Classification Search
CPC ............. G06F 16/285; G06F 16/24573; G06F 16/221; G06F 16/2237; G06F 3/064
See application file for complete search history.

(56) References Cited

U.S. PATENT DOCUMENTS

| | | | |
|---|---|---|---|
| 2015/0287210 A1* | 10/2015 | Song .......... | G06T 11/60 382/173 |
| 2020/0210421 A1* | 7/2020 | Meng .......... | G06F 16/2282 |
| 2021/0312587 A1* | 10/2021 | Lei .......... | G06V 10/74 |

FOREIGN PATENT DOCUMENTS

| | | | |
|---|---|---|---|
| CN | 101339570 B | * | 12/2011 |
| CN | 103995861 A | | 8/2014 |

(Continued)

*Primary Examiner* — Brittany N Allen
*Assistant Examiner* — William P Bartlett
(74) *Attorney, Agent, or Firm* — SV Patent Service (57) ABSTRACT

A parallel data access method for massive remote-sensing images includes: 1) segmenting a remote-sensing image to be processed using a set grid system, data in each grid corresponding to a data block; 2) collecting a data access log of an underlying distributed object storage system Ceph in a past period of time, and measuring a load index of each Ceph cluster and a load index of each pool; 3) selecting a pool with a minimum load in a Ceph cluster with a minimum current load to serve as a storage position of a current data block, and writing each data block into a corresponding pool; 4) returning a data identifier dataid and a data access path of the remote-sensing image; and 5) storing metadata of each data block in a metadata database. The method can support rapid and high-concurrency read and write of large-area data of a grid data block.

8 Claims, 5 Drawing Sheets

(56) References Cited

FOREIGN PATENT DOCUMENTS

| | | | |
|---|---|---|---|
| CN | 104320495 A | | 1/2015 |
| CN | 108829836 A | * | 11/2018 |

* cited by examiner

PARALLEL DATA ACCESS METHOD AND SYSTEM FOR MASSIVE REMOTE-SENSING IMAGES

TECHNICAL FIELD

The invention relates to a parallel data access method and system for massive remote-sensing images.

BACKGROUND OF THE INVENTION

In recent years, a large number of aerospace sensor equipment has been put into use to obtain massive remote-sensing image data. In the past half century, hundreds of earth observation satellites have been launched worldwide to carry out comprehensive observation on the earth system, including atmospheric system, marine system and terrestrial system. These data make it possible to apply the detailed analysis, change monitoring and management of the earth's surface, which has great significance to ecological research, land management and disaster monitoring. At present, the publicly accessible remote-sensing image data has reached the PB level, the images have the characteristics of wide source, diversification, multi-temporal phase, multi-scale, high dimension, high complexity and non-construction besides the general property of big data, and many parallel access technologies for the traditional data cannot well solve the problems existing in large-scale remote-sensing image analysis and processing.

At present, in order to deal with mass data storage and large-scale parallel access, the most widely used technology is distributed file system, such as GFS (Google File System) introduced by Google, and HDFS and Moose FS inspired by it, which are all adopted with typical master-slave modes in designing architecture, namely one Master server is responsible for storage and maintenance of global metadata information, and a plurality of Chunk Servers are responsible for specific data storage and reading and writing; and the data storage is in units of fixed-size data blocks, and each data block can be stored in multiple copies on different nodes in order to improve reading and writing parallelism and deal with node faults.

For traditional data (such as text-type large data stored by lines), the performance of this kind of storage system has obvious advantages, but there are many limitations on binary data storage with more additional attributes. Firstly, this kind of storage system cannot handle the association storage of binary entity data and text-type attribute data well. Secondly, although this kind of storage system belongs to block storage, the partitioning is based on the size of data; and the key information such as the spatial range of the remote-sensing image data itself cannot be considered, and the system generally has the problem of single point failure because the main node is only one.

The commonly used partitioning strategy of spatial data is that all the data adopt the same grid system, and the grid size is expressed by the measurement unit of a certain coordinate system. For example, under the EPSG: 4326 projection, the grid size is measured by the degree. The advantage of this kind of partitioning storage strategy is that the data retrieval speed is fast, and the reading and writing interface is simple. However, as the resolution of different remote-sensing image data is different, the data under the same grid cannot be directly merged and calculated. The data size difference of different remote-sensing images corresponding to the same grid can be very large. For example, 500 m resolution image data in the MODIS data is more than ten times larger than the landsat image data with the resolution of 30 m, so that the reading and writing load difference of different image data under the same grid is very large.

SUMMARY OF THE INVENTION

For the technical problems existing in the prior art, the invention aims to provide a parallel data access method and system for massive remote-sensing images, which can support rapid and high-concurrency reading and writing of large-area data based on divided grid data blocks. In order to facilitate user use and shield internal differences of different types of remote-sensing image data, the invention provides a plurality of driving programs for different types of data on the basis of the subdivision structure. Meanwhile, data conversion operations such as real-time re-projection, resampling and the like in the reading process are supported, and the underlying storage capacity supports elastic extension.

The technical solution adopted by the invention is as follows.

A data storage method for massive remote-sensing images comprises the steps of:

1) while keeping original remote-sensing image projection unchanged, segmenting a remote-sensing image according to a spatial position by taking the coordinate origin point of an original projection system of an remote-sensing image to be subdivided as a reference, taking pixels of a remote-sensing image to be subdivided as units, and setting a grid size as a fixed value, wherein the data in each grid corresponds to a data block; and numbering each data block and calculating offset information of a pixel point at the upper left corner of the corresponding data block relative to a pixel point at the upper left corner of the remote-sensing image;

2) collecting a data access log of an underlying distributed object storage system Ceph in a past period of time, counting the number of data requests processed by and the data amount transmitted by different Ceph clusters in the underlying distributed object storage system Ceph and different storage pools in the same Ceph cluster, quantifying the load conditions of each Ceph cluster and each pool in the same Ceph cluster according to the statistical information, and measuring a load index of each Ceph cluster and a load index of each pool;

3) selecting, according to the load indexes determined in step 2), a pool with a minimum load in a Ceph cluster with a minimum current load to serve as a storage position of a current data block, and writing each data block into a corresponding pool;

4) after each data block is successfully stored, returning a data identifier dataid and a data access path of the remote-sensing image; and 5) storing metadata of each data block in a metadatabase.

Further, each data block file segmented in the step 1) is parsed into an N-dimensional matrix grid unit, and then the N-dimensional matrix unit corresponding to each data block is written into a corresponding pool in parallel; wherein the dimension N is determined according to the grid size of the set grid system.

Further, the access path is /dboxstorage/<ceph_idx>/<pool_idx>/<dataid>; wherein dboxstorage is a fixed prefix of the data access path and serves as an identifier of a virtual file system; ceph_idx represents a Ceph cluster of data storage; and pool_idx represents the pool in which the data resides.

Further, a pool load index at time t is $$factor_t = 0.3 * factor_{t-1} + 0.5 * \frac{M - conns}{65535} * 100 + 0.2 * \frac{vol_{max} - vol}{vol_{max}} * 100,$$

wherein $factor_{t-1}$ represents the load factor at the time t−1; conns represents the number of connections in the past period of time; M is the maximum number of connections which can be processed simultaneously and concurrently by one storage node; $vol_{max}$ is the maximum amount of data that can be transmitted over the past period of time; and vol is the total amount of data transferred over the past period of time.

Further, in the step 1), the grid system is determined to segment the remote-sensing image to be processed according to projection coordinate system information contained in the remote-sensing image data.

Further, the data blocks are stored in the underlying distributed object storage system ceph in GeoTIFF format, each data block being uniquely determined by the filename of the remote-sensing image plus the row and column number of the current data block, wherein the meta database is a database of a key value pair type.

A parallel data access method includes the following steps:
1) receiving, by a back-end data service, a retrieval request initiated by a client, and retrieving all data blocks related to the reading and writing in the metadata database according to the data identifier dataid in the retrieval request and the spatial range to be read and written, each data block being provided with a grid number;
2) determining, by the back-end data service, a specific access path of each data block according to the data identifier dataid and the grid number of the data block, and returning the specific access path to the client;
3) after receiving, by the back-end data service, a data parallel reading and writing request initiated by the client, performing projection transformation and resampling operations on the retrieved remote-sensing image according to parameters in the data parallel reading and writing request, wherein the client constructs the data parallel reading and writing request based on all access paths returned in the step 2), and the parameters in the data parallel reading and writing request comprise boundary range, projection transformation and resampling; and
4) performing, by the back-end data service, data cutting according to the parameters in the data parallel reading and writing request, and feeding a processing result to the client.

A parallel data access method comprises the steps of:
1) receiving, by the back-end data service, a reading and writing request of a client, and retrieving each data block related to the reading and writing in a metadata database according to the data identifier dataid in the reading and writing request and the spatial range to be read and written, each data block being provided with a grid number; wherein the reading and writing request parameters comprise the data identifier dataid, the spatial range, projection transformation and resampling information of target data;
2) performing, by the back-end data service, the projection transformation and the resampling on the retrieved remote-sensing image according to the parameters in the reading and writing request; and
3) cutting, by the back-end data service, the target data according to the spatial range in the reading and writing request, and finally returning the processing result to the client.

A parallel data access system for massive remote-sensing images includes a storage unit, a grid granularity task parallel access unit and a global scale data access unit; wherein
the storage unit is configured for segmenting a remote-sensing image to be processed by using a set grid system, data in each grid corresponding to a data block; numbering each data block and calculating offset information of a pixel point at the upper left corner of the corresponding data block relative to a pixel point at the upper left corner of the remote-sensing image; then selecting a pool with a minimum load in a Ceph cluster with a minimum current load in the underlying distributed object storage system ceph to serve as a storage position of the current data block, and writing each data block into the corresponding pool; and after each data block is successfully stored, returning a data identifier dataid and a data access path of the remote-sensing image, and storing metadata of each data block in a metadata database;
the grid granularity task parallel access unit is configured to receive a retrieval request initiated by a client, and to retrieve all data blocks related to the reading and writing in the metadata database according to the data identifier dataid in the retrieval request and the spatial range to be read and written, each data block being provided with a grid number, to determine a specific access path of each data block according to the data identifier dataid and the grid number of the data block, and to return the specific access path to the client; after receiving a data parallel reading and to write request initiated by a client, to perform projection transformation and resampling operations on the remote-sensing image read and written according to parameters in the data parallel reading and writing request, then to perform data cutting according to parameters in the data parallel reading and writing request, and to feedback a processing result to the client, wherein the parameters in the parallel access data include a boundary range, projection transformation and resampling information;
the global scale data access unit is configured for receiving a reading and writing request of the client, and retrieving each data block related to the reading and writing in the metadata database according to the data identifier dataid in the reading and writing request and the spatial range to be read and written, each data block being provided with a grid number, wherein the reading and writing request parameters comprise the data identifier dataid, the spatial range of target data, projection transformation and resampling information; then performing the projection transformation and the resampling on the retrieved remote-sensing image according to the parameters in the reading and writing request; and cutting the target data according to the spatial range in the reading and writing request, and finally returning the processing result to the client.

Further, the storage unit parses each segmented data block file into an N-dimensional matrix grid unit, and then the N-dimensional matrix unit corresponding to each data block is written into a corresponding pool in parallel; wherein the dimension N is determined according to the grid size of the set grid system.

Compared with the conventional technologies, the presently disclosed invention can have one or more of the following benefits:

1) On the basis of keeping the original remote-sensing image projection unchanged, fine grit subdivision is performed on the remote-sensing image to form a small-area data object and storing the small-area data object in a cloud storage environment, thereby supporting large-scale parallelization access.
2) The factors of flow, connection number and the like are comprehensively considered, a load factor is designed, the access pressure of each data node is balanced, and the overall data throughput is improved.
3) In consideration of the limitation of the access interface of the Ceph system, the reading and writing interface for the remote-sensing image data subdivision slicing is realized based on the librados. On the basis of this, the upper-layer data access interface is standardized according to the grid data format of the GDAL, which is completely compatible with the GDAL standard library.
4) For different application access modes, the invention provides a multi-scale efficient data access interface, which not only can access fine grit data blocks, but also can access integral continuous area data.

DETAILED DESCRIPTION OF THE INVENTION

The invention will be further explained in combination with the attached drawings and embodiments below.

1. Grid Subdivision Storage

On the basis of keeping original remote-sensing image projection unchanged, a remote-sensing image is segmented according to a spatial position by taking the coordinate origin (0, 0) of an original projection system of a remote-sensing image to be subdivided as a reference, taking pixels of the remote-sensing image to be subdivided as units and taking 2000*2000 pixels as grid sizes. Different projections and resolutions use different subdivision grid systems for remote-sensing data, as shown in FIG. 1.

Figure 1:
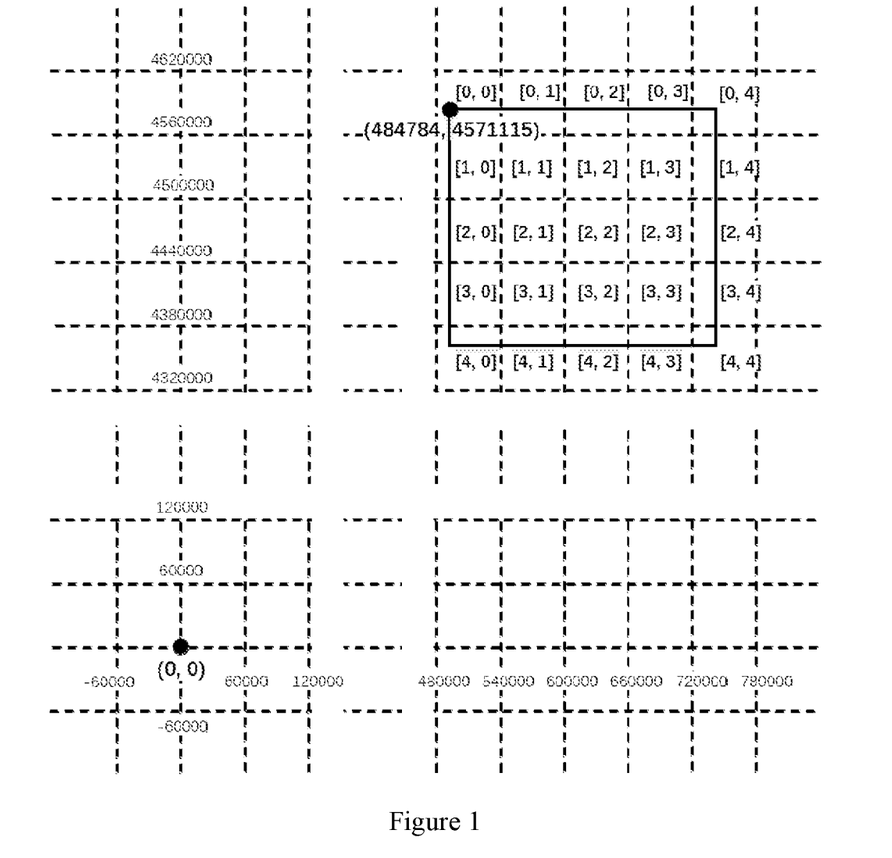
FIG. 1 is an exemplary diagram of a subdivision grid of a 30 m resolution remote-sensing image under the projection EPSG: 32650.

FIG. 1 is a schematic diagram of a split grid of a remote-sensing image with a resolution of 30 meters under the projection EPSG:32650, wherein the solid rectangle is a schematic diagram of the original remote-sensing image with upper left coordinate (484784, 4571115), namely minx=484784 and maxy=4571115; the resolution is 30 meters (pixel width pixelsize$_x$=30 m; pixel height pixelsize$_y$=30 m), the number of pixels in the x direction is 8261, and the number of pixels in they direction is 7161. The dotted line represents a grid that subdivides the global region starting from the origin of the projection coordinate system of the original remote-sensing image. The size of the grid, npixels, is set according to the resolution (width and height of pixels) of the remote-sensing image and the requirements of the computing application. If the grid is too large, the amount of work to read each grid becomes large; and the grid is too small, too many grids are divided. Here, the grid size is set to 2000 pixels, that is, the width and height of the grid are respectively as follows:

$$tilesize_x = 2000 * pixelsize_x = 60000 \text{ m}$$

$$tilesize_y = 2000 * pixelsize_y = 60000 \text{ m}$$

Remote-sensing images of this projection and resolution are segmented by adopting the set grid system, a grid number of the segmented remote-sensing image is marked, such as arrays [0, 0] . . . [4, 4] marked in FIG. 1, and offset information is calculated for a pixel point at the upper left corner of the marked grid relative to a pixel point at the upper left corner of the original remote-sensing image. The calculation formula is as follows:

$$lt\_gx, lt\_gy = \text{int}(minx/tilesize_x), \text{int}(maxy/tilesize_y)$$

$$rb\_gx, rb\_gy = \text{int}(maxx/tilesize_x), \text{int}(miny/tilesize_y)$$

$$w0 = tilesize_x - (minx - lt\_gx * tilesize_x * resolution_x)/resolution$$

$$h0 = tilesize_y - (lt\_gy * tilesize_y * resolution_y - maxy)/resolution$$

The original remote-sensing image is segmented into a plurality of sub data blocks according to the grid, and the subdivision pseudo code of the original remote-sensing image is as follows:

```
void rsdata_divide(datapath){
    minx, maxy = coordinates of the upper left corner of the
    remote-sensing image
    maxx, miny = coordinates of the lower right corner of the
    remote-sensing image
    lt_gx, lt_gy = int(minx/tilesize.x), int(maxy/tilesize.y)
    rb_gx, rb_gy = int(maxx/tilesize.x), int(miny/tilesize.y)
    w0 = tilesize.x - (minx - lt_gx*tilesize.x*resolution.x) / resolution
    h0 = tilesize.y - (lt_gy*tilesize.y*resolution.y - maxy) / resolution
    i, j = lt_gx, lt_gy
    for i = lt_gx; i <= rb_gx; i++ then
        for j = lt_gy; j >= rb_gy;j -- then
            if i == rb_gx then
                x = 0
                w = w0
            else:
                x = w0 + (i - lt_gx - 1)*tilesize.x
                w = tilesize.x
            endif
            if j == rb_gy then
                y = 0
                h = h0
            else:
                y = h0 + (lt_gy - j - 1)*tilesize.y
                h = tilesize.y
            endif
            data_block = clip(datapath, x, y, w, h)
            save2ceph(datapath, datablock, x, y)
endfor.
```

2. Subdivision Data Warehousing

Figure 2:
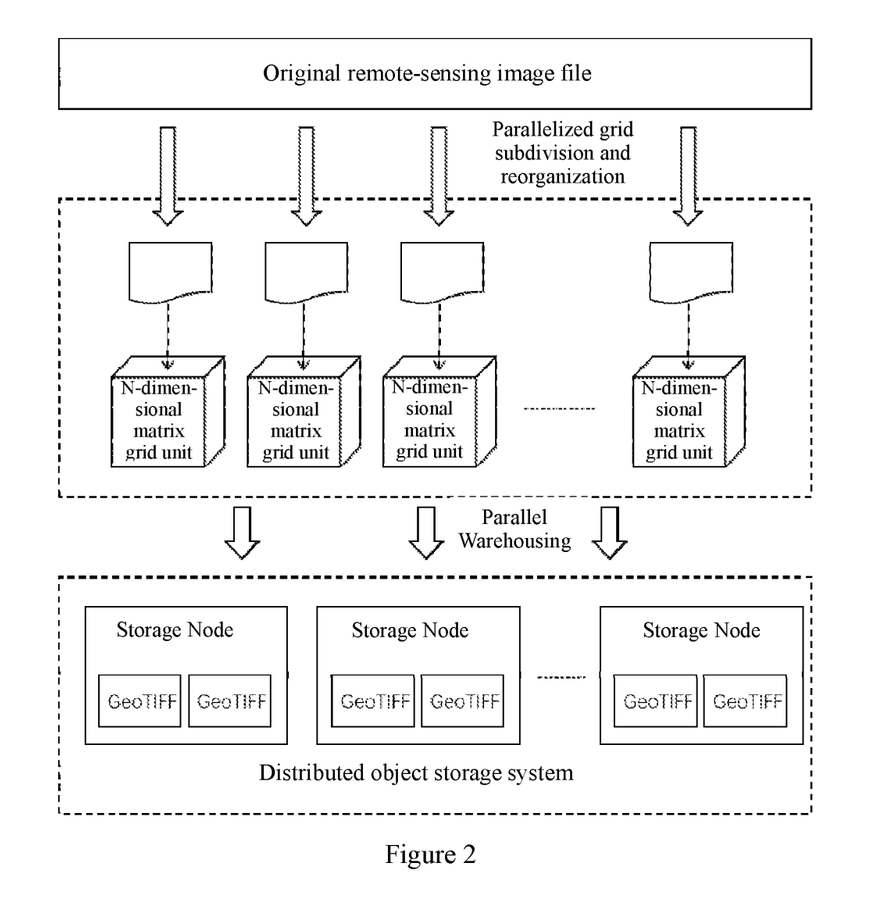
FIG. 2 is a flow chart of remote-sensing image subdivision.

Besides updating spatial information such as a boundary range, a central point and the like, all metadata information obtained after subdivision is consistent with the complete file before subdivision, such as a projection coordinate system, a satellite identifier, a sensor identifier and the like. All data blocks are uniformly stored in the underlying distributed object storage system Ceph in GeoTIFF format. Ceph not only has the characteristics of high availability, easy expansion and the like of the traditional distributed file system, but also abandons the traditional addressing scheme of centralized storage metadata in the data block addressing, and adopts the CRUSH algorithm, so that the data distribution is more balanced and the parallelism is higher. The process for subdividing and warehousing the remote-sensing image data is shown in FIG. 2.

The process for parallel segmentation and warehousing of the remote-sensing images includes:

1) determining a subdivision grid system according to projection coordinate system information contained in the original remote-sensing image data, further determining a data subdivision scheme, and numbering each subdivided data block by line from the upper left corner (numbered as [0, 0]), as shown in FIG. 1;
2) cutting the original remote-sensing image according to the scheme determined in the step 1), wherein each grid corresponds to one data block (file), the data blocks are stored in GeoTIFF format, and each data block is uniquely determined by the original file name plus the row and column number of the current data block;
3) collecting data access logs of an underlying Ceph cluster for a past period of time (such as 1 hour or 1 day), analyzing statistical information such as the number of data requests processed by, the amount of data transmitted by and the like by different Ceph clusters and different pools (storage pools, which can be regarded as logical partitions) of the same Ceph cluster, and quantifying the load conditions of each Ceph cluster and each pool of each Ceph cluster according to the statistical information, which are used as an index for measuring the load size of each pool. The index calculation formula mentioned in the invention is as follows:

$$factor_t = 0.3 * factor_{t-1} + 0.5 * \frac{65535 - conns}{65535} * 100 + 0.2 * \frac{vol_{max} - vol}{vol_{max}} * 100$$

wherein $factor_{t-1}$ represents the load factor one hour ago; conns represents the number of connections in a one hour past, 65535 is the maximum number of connections which can be processed simultaneously and concurrently by one storage node; $vol_{max}$ represents the maximum amount of data that can be transmitted within one hour, which is obtained by counting according to historical data; and vol represents the total amount of data transferred over the one hour past;
4) selecting the Ceph cluster with the smallest current load according to the load index determined in the step 3), selecting the pool with the smallest load as the data storage position for this time, providing a uniform reading and writing interface in order to facilitate subsequent use in consideration of the diversity of original remote-sensing image data formats, parsing each data block file segmented in the step 1) into N dimensions (the dimension is determined by the size of a grid; according to the invention, N=2000), and writing the N-dimensional matrix units corresponding to each data block into the pool (storage pool) in parallel;
5) After the data is successfully stored, returning a dataid as a unique identifier of the original remote-sensing image file, and generating a new data access path: /dboxstorage/<ceph_idx>/<pool_idx>/<dataid>;

wherein dboxstorage is a fixed prefix of the data access path and serves as an identifier of the virtual file system; ceph_idx represents which cluster the current data is stored in; pool_idx represents which pool (storage pool) in the current data storage cluster ceph_idx; dataid is a data identifier of the original remote-sensing image stored in the ceph. The identifier is globally unique, and the user is responsible for storing the access path which is used as the identifier of the next access.

6) The metadata information for data blocks is stored in a metadata database (key-value pair database, such as redis/mongodb, and so on) for subsequent indexing, and the storage structure is as follows:

```
{
  dataid: [{
    path: /dboxstorage/<ceph_idx>/<pool_idx>/<dataid>, # data access path
    row: x, # row number of current data block
    col: y, # column number of current data block
    bbox: [minx, miny, maxx, maxy], # spatial extent of current data block
    name: xxx.tiff # original file name
    meta: {
       timestamp: yyyy-mm-dd hh:mm:ss,
       center: [x, y],
       sensorid: xxxxx
         //other metadata information},
    ... # additional data blocks
  ]
}.
```

3. Data Reading and Writing Interface

Figure 3:
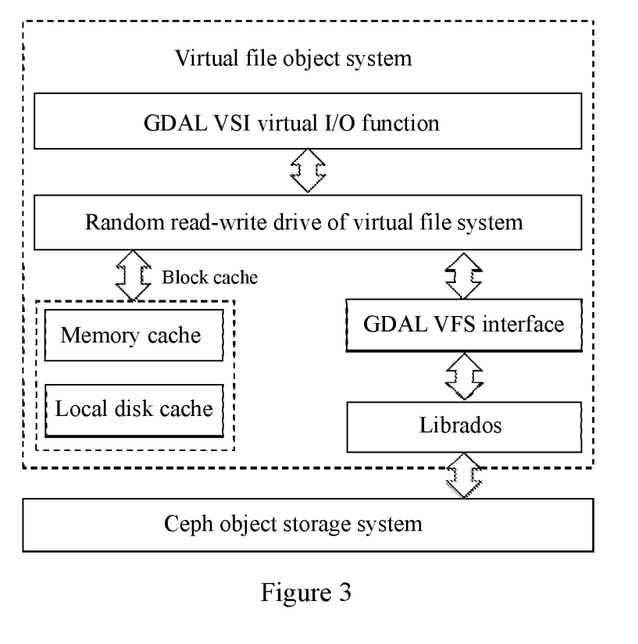
FIG. 3 is an architecture diagram of virtual file objects.

In order to shield complicated subdivision rules at the bottom layer, on the basis of GDAL raster data interface specifications, the invention designs and realizes a new GDAL raster data drive, and can quickly access subdivision slices stored in the Ceph cluster environment, as shown in FIG. 3.

In consideration of the limitation of the access interface of the Ceph system, the reading and writing interface for the remote-sensing image data subdivision slicing is realized based on the librados. On the basis of this, design and development are carried out according to the grid data format specification of the GDAL, and the data type can be registered as required, which is flexible and controllable and is completely compatible with the GDAL standard library. In use mode, GDAL API can be directly used for accessing subdivision data, and a more detailed data access interface with higher concurrency is provided, so that internal complex subdivision rules are shielded, the use of the system is simplified, and two application modes, namely grid granularity parallel access and global scale data access, are externally applied.

3.1 Grid Granularity Task Parallel Access

The grid granularity-based application mode exposes the underlying grid data blocks contained in the original image to a user, and the user is responsible for reading and writing access to each independent grid data block. The model is suitable for scenarios in which grid data blocks are independent of each other, such as NDVI computation, and the user can perform separate parallel reading and writing computation on each grid data block and then perform summary statistics.

Figure 4:
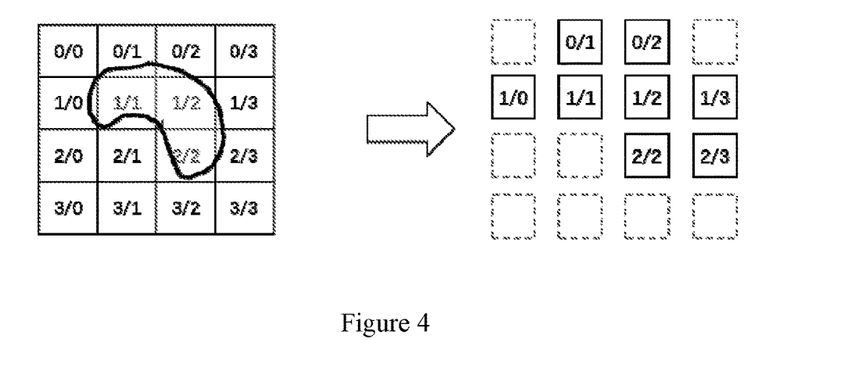
FIG. 4 is a schematic diagram of parallel reading and writing of data blocks.

As described above, after the data blocks are imported into the storage system and are uniquely identified by the dataid and the grid number, a client user can read a plurality of grid data blocks belonging to the same remote-sensing image data in parallel according to specific requirements, as shown in FIG. 4.

Figure 5:
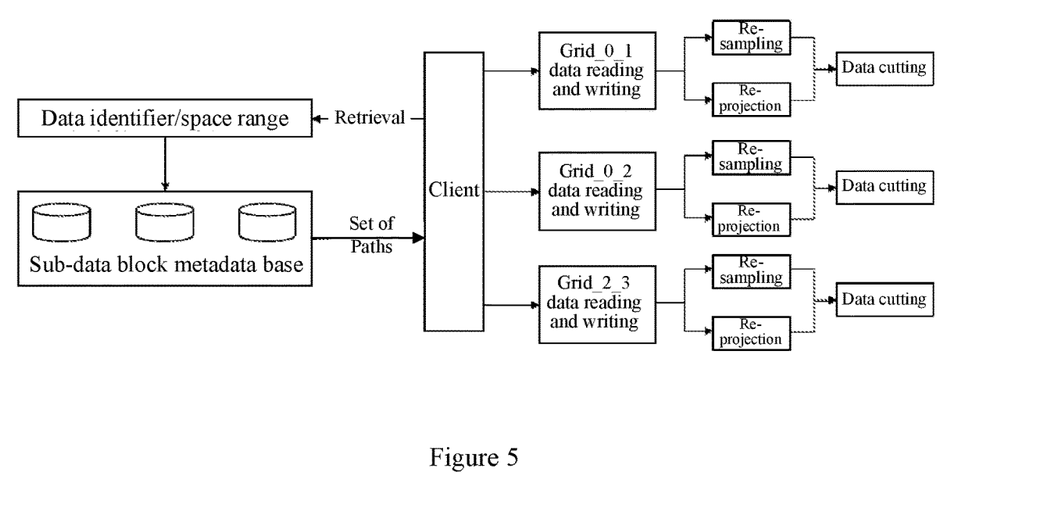
FIG. 5 is a flow chart of a request for the parallel reading and writing of data blocks.

It is assumed that the client program needs to read and write data of an area of remote-sensing image data (uniquely identified by the dataid) covered by a black box line. Firstly, the invention makes intersect query for all data blocks with the dataid in the data block metadata database by taking a space area covered by a black box line as a condition to obtain data blocks related to the current reading and writing, including [0, 1], [0, 2], [1, 0], [1, 1], [1, 2], [1, 3], [2, 2], [2, 3]. Then a client program initiates a parallel reading and writing request, and the parallel reading and writing process is shown in FIG. 5. The specific scheme includes:

1) initiating by the client a retrieval request for certain remote-sensing image data to a back-end data service, wherein the request parameters include data identifier dataid and the space area to be read and written; and the query interface is QueryTiles(pCutline: 'char const*', nMaxItems: 'int'=10, sProj: 'char const*'=None, bStrict: 'bool'=False), where pCutline represents the spatial extent of this retrieval, supports formats such as WKT/GeoJSON, and also supports shapefile storage paths, and nMaxItems represents a maximum number of Geometry used; sProj: the standard projection information text can be None or " ", and if the parameter is specified, it is used in priority; otherwise, projection of the pCutline is used; if the pCutline is json or wkt, no projection is carried out; if sProj is None, the default is EPSG: 4326; and if sProj is " ", projection processing is performed by using a data set; bStrict: slice range intersection (True) or standard grid range intersection (False);
2) after receiving, by a back-end data service, a retrieval request initiated by a client, firstly retrieving all data blocks related to reading and writing in a metadata database according to the data identifier dataid and the spatial range to be read and written, wherein each data block is identified by a grid number;
3) according to the data identifier dataid and the grid number of the data blocks, further determining the specific access path of each data block in the ceph; for example, the access path of the data block corresponding to the grid of the second row, the third column of a certain image is as follows: /dboxstorage/ceph_idx/pool_idx/dataid/1_2.DBOX;
4) returning the access paths of all the data blocks to the client;
5) constructing, by the client, a data parallel reading and writing request based on all paths returned in the step 4), wherein the data parallel reading and writing request includes relevant parameters such as boundary range, projection transformation, resampling and the like, and all reading and writing requests for different data blocks are uniformly processed in parallel by a background data service; the read interface is ReadTile (datablock 'string', pCutline: 'char const*', resolution 'int', proj 'string'), the write interface is: WriteTile (data 'bytes', datablock 'string', pCutline: 'char const*', resolution 'int', proj 'string'), wherein datalock represents a storage path, pCutline represents a boundary range of the current reading and writing, supports formats such as WKT/GeoJSON, and also supports a storage path of shapefile; resolution represents a target resolution (resampling) of the reading and writing, and proj represents a resolution (projection transformation) of target data;
6) after receiving, by the back-end data service, a data parallel reading and writing request initiated by the client, performing projection transformation, resampling and other related operations on the retrieved data block according to parameters in the request; and
7) after the back-end service completes the reading and writing operation specified by the client, performing the reading and writing operation, and data cutting according to the parameters in the request, and finally feeding relevant processing results back to the client.

3.2 Global Scale Data Access

The application mode based on the global scale can automatically hide the subdivision data blocks at the underlying layer; and when a user performs reading and writing operations, the user sees complete continuous data instead of the independent data blocks being cut. This mode is applicable to scenarios where the grid data blocks may be interdependent, such as clustering based on pixel values, etc.

Figure 6:
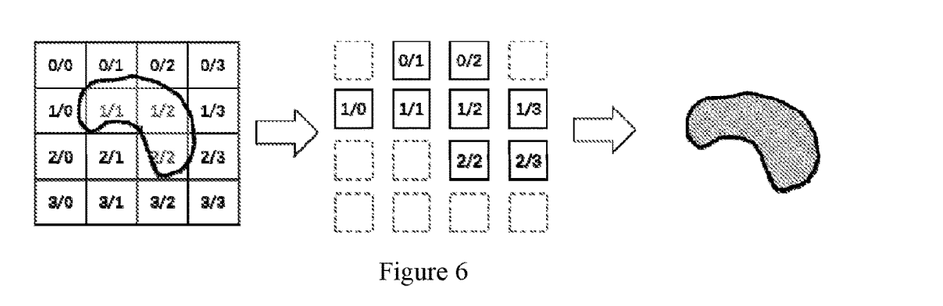
FIG. 6 is an exemplary diagram of continuous data reading and writing.

Taking the data of FIG. 4 as an example, in this mode, after the user initiates a reading and writing request, the resulting data is complete contiguous data covered by the black box line, rather than a collection of independent grid data blocks, as shown in FIG. 6.

Figure 7:
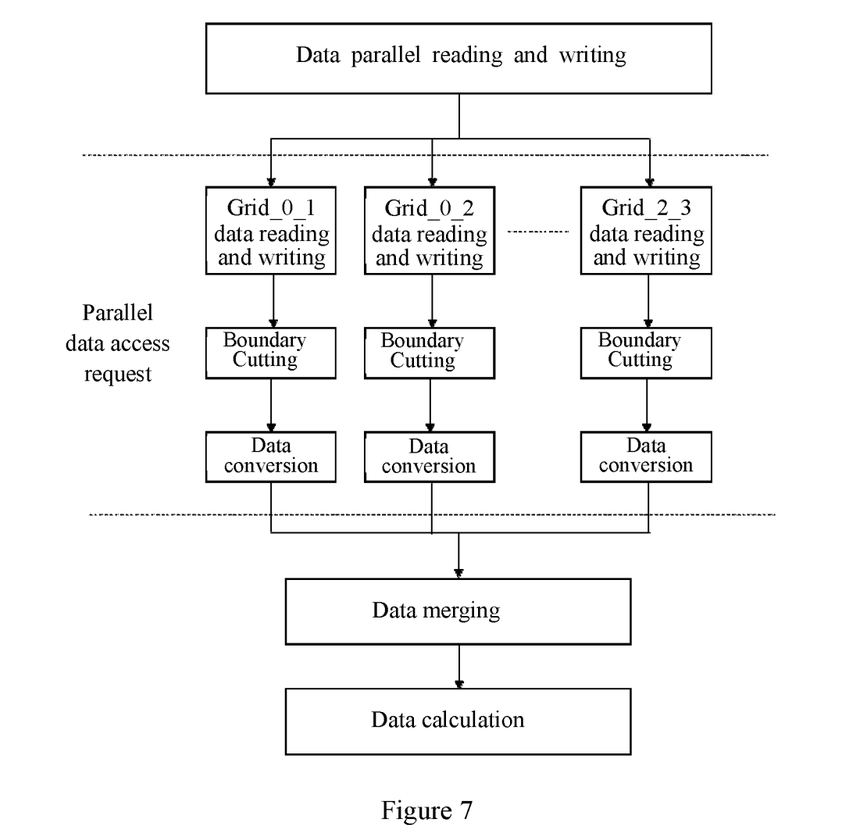
FIG. 7 is a flow chart of a request for the continuous data reading and writing.

A detailed reading and writing process is shown in FIG. 7, and an exemplified process can include:

1) initiating, by the client, a reading and writing request for certain remote-sensing image data, wherein the request parameters includes data identifier dataid and a spatial range (GeoJSON, WKT and the like) of target data, and may also include relevant parameters such as projection transformation, resampling and the like according to specific applications; and the reading and writing interface is ReadRegion and WriteRegion, with main parameters including a data area range, a target projection coordinate system (when for reading, the parameter is the coordinate projection expected by a user, when for writing, the parameter is the coordinate projection of the data to be written), and a resolution (when for reading, the parameter is the resolution expected to be read by the user and can only be lower than the original data, and when for writing, the parameter is the resolution of the data to be written);
2) after receiving, by a back-end data service, a reading and writing request by a client, firstly retrieving all data blocks related to the reading and writing according to the data identifier dataid and a spatial range to be read-written in the metadata database, wherein each data block is identified by a grid number, and a specific access path of each data block in ceph is further determined according to the data identifier dataid and the grid number of the data block;
3) uniformly processing all reading and writing requests for different data blocks in parallel by the background data service, and performing relevant operations such as projection transformation, resampling and the like on the retrieved data blocks according to parameters in the requests; and
4) cutting the target data according to the spatial range in the reading and writing request, and finally returning the result to the client.

The above embodiments are merely illustrative of the present invention and are not intended to be limiting thereof, and modifications or equivalent replacements may be devised by those skilled in the art without departing from the spirit and scope of the present invention, which is defined in the appended claims.

What is claimed is:

1. A data storage method for massive remote-sensing images, comprising:
   1) while keeping an original remote-sensing image projection unchanged, segmenting a remote-sensing image according to a spatial position by taking a coordinate origin point of an original projection system of a remote-sensing image to be subdivided as a reference, taking pixels of the remote-sensing image to be subdivided as units, and setting a grid size as a fixed value, wherein data in each grid corresponds to a data block; and numbering each data block and calculating offset information of a pixel point at an upper left corner of a corresponding data block relative to a pixel point at the upper left corner of the remote-sensing image, wherein each data block file segmented is parsed into an N-dimensional matrix grid unit, wherein the N-dimensional matrix grid unit corresponding to each data block is written into a corresponding pool in parallel;
   2) collecting a data access log of an underlying distributed object storage system in a past period of time, counting a number of data requests processed by and data amount transmitted by different clusters in the underlying distributed object storage system and different storage pools in a same cluster, quantifying load conditions of each cluster and each pool in a same cluster according to statistical information, and measuring a load index of each cluster and a load index of each pool;
   3) selecting, according to the load index determined in step 2), a pool with a minimum load in a cluster with a minimum current load to serve as a storage position of a current data block, and writing each data block into a corresponding pool;
   4) after each data block is stored, returning a data identifier dataid and a data access path of the remote-sensing image; and
   5) storing metadata of each data block in a meta database.

2. The method according to claim 1, wherein the dimension N is determined according to a grid size of a set grid system.

3. The method according to claim 1, wherein the data access path is characterized by/dboxstorage/<ceph_idx>/<pool_idx>/<dataid>, wherein dboxstorage is a fixed prefix of the data access path and serves as an identifier of a virtual file system; ceph_idx represents a cluster of data storage; and pool_idx represents the pool in which the data resides.

4. The method according to claim 1, wherein a pool load index at time t is $\lfloor factor \rfloor\ t = 0.3 * \lfloor factor \rfloor\ (t-1) + 0.5 * (M - conns)/M * 100 + 0.2 * \lfloor vol \rfloor\ max - vol)/\lfloor vol \rfloor\ max * 100$, wherein $\lfloor factor \rfloor\ (t-1)$ represents a load factor at the time t−1, conns represents a number of connections in a past period of time, M is a maximum number of connections which can be processed simultaneously and concurrently by one storage node, $\lfloor vol \rfloor$ max is a maximum amount of data that can be transmitted over the past period of time, and vol is a total amount of data transferred over the past period of time.

5. The method according to claim 1, wherein in the step 1), the remote-sensing image to be processed is segmented by a grid system according to projection coordinate system information contained in the remote-sensing image data.

6. The method according to claim 1, wherein data blocks are stored in the underlying distributed object storage system in GeoTIFF format, each data block being uniquely determined by a filename of the remote-sensing image plus a row number and a column number of the current data block, wherein the meta database is a database of a key value pair type.

7. A parallel data access method based on data stored by the method according to claim 1, comprising:
   1) receiving, by a back-end data service, a retrieval request initiated by a client, and retrieving all data blocks related to reading and writing in the metadata base according to the data identifier dataid in the retrieval request and a spatial range to be read and written, each data block being provided with a grid number;
   2) determining, by the back-end data service, a specific access path of each data block according to the data identifier dataid and the grid number of the data block, and returning the specific access path to the client;
   3) after receiving, by the back-end data service, a data parallel reading and writing request initiated by the client, performing projection transformation and resampling operations on the retrieved remote-sensing image according to parameters in the data parallel reading and writing request, wherein the client constructs the data parallel reading and writing request based on all access paths returned in the step 2), and the parameters in the data parallel reading and writing request comprise boundary range, projection transformation and resampling; and
   4) performing, by the back-end data service, data cutting according to the parameters in the data parallel reading and writing request, and feeding a processing result back to the client.

8. A parallel data access method based on data stored by the method according to claim 1, comprising:
   1) receiving, by the back-end data service, a reading and writing request of a client, and retrieving each data block related to the reading and writing in a metadata base according to the data identifier dataid in the reading and writing request and a spatial range to be read and written, each data block being provided with a grid number; wherein the reading and writing request parameters comprise the data identifier dataid, the spatial range, projection transformation and resampling information of target data;
   2) performing, by the back-end data service, the projection transformation and the resampling on the retrieved remote-sensing image according to the parameters in the reading and writing request; and
   3) cutting, by the back-end data service, the target data according to the spatial range in the reading and writing request, and finally returning the processing result to the client.

* * * * *